United States Patent Office 3,009,965
Patented Nov. 21, 1961

3,009,965
BIS-NITROSOHYDROCARBON PRODUCTS
Eugen Mueller, 33 Wilhelmstrasse, Tuebingen, Germany, and Horst Metzger and Dorla Metzger-Fries, both of 59 Pfalzgrafenstrasse, Ludwigshafen (Rhine), Germany
No Drawing. Original application Mar. 25, 1955, Ser. No. 496,946. Divided and this application Dec. 14, 1959, Ser. No. 859,099
Claims priority, application Germany Mar. 30, 1954
3 Claims. (Cl. 260—647)

This invention relates to bis-nitrosohydrocarbon products, and in particular to such products as can readily be rearranged into useful ketoximes.

This application is a divisional application of our co-pending application, Ser. No. 496,946, filed March 25, 1955, the disclosure of which is incorporated herein by reference as fully as if it had been set forth in its entirety.

It is already known (cf. M. A. Naylor and A. W. Anderson, Journal of Organic Chemistry 18 (1953), page 115), that cyclohexanone oxime can be prepared by the action of nitrosyl chloride on cyclohexane in light.

This method is unsuitable for industrial conditions because it only proceeds without the formation of large amounts of by-products when it is carried out at very low temperatures (−25° C.) while using very dilute nitrosyl chloride, so that the speed of reaction is unsatisfactory.

We have now found that bis-nitrosohydrocarbons as new compounds are obtained in an advantageous manner by allowing a mixture of nitric oxide and chlorine in which the nitric oxide is present in a large molecular excess with respect to the chlorine to act on a saturated aliphatic or cycloaliphatic hydrocarbon while irradiating with light. Stable bis-nitrosohydrocarbons are obtained as the main products of this reaction and are valuable intermediate products because they can be caused to rearrange into the corresponding ketoximes which are known to the art. The ketoximes are obtained after separating the unreacted hydrocarbon of the foregoing reaction, either heating the reaction product which remains as such for some time at about 50° to 150° C., or first reducing the 1-chlor-1-nitrosohydrocarbon formed as a by-product and only heating to about 50° C. to 150° C. the bis-nitroso-hydrocarbon formed as the main product.

Suitable initial materials include cyclohexane, cyclopentane, cycloheptane, cyclo-octane, methylcyclopentane, methylcyclohexane, heptane or dodecane. These hydrocarbons may be diluted with inert diluents, such as carbon tetrachloride. As a class, the reactant hydrocarbons can be designated as alkanes and cycloalkanes having from 5 to 12 carbon atoms and under the reaction conditions are converted to the corresponding bis-nitrosoalkanes and bis-nitroshcycloalkanes having from 10 to 24 carbon atoms, e.g. bis-nitrosocyclohexane, bis-nitrosocyclo-octane, bis-nitrosomethylcyclohexene, bis-nitroso-n-heptane and bis-nitrosocycloheptane.

For the reaction with the hydrocarbon it is good practice to use a mixture of nitric oxide and chlorine which contains about 2 to 15 mols of nitric oxide or more for each mol of chlorine. The gases are led into the hydrocarbon either as such or in admixture, preferably in a finely dispersed form. The most favorable temperatures and pressures vary in each case and are ascertainable by preliminary tests; in general the reaction is carried out at about −10° to +40° C. and at atmospheric or moderately increased pressure, as for example at 5 atmospheres.

The reaction, when using cyclohexane as an example of the initial material, presumably takes place according to the following scheme:

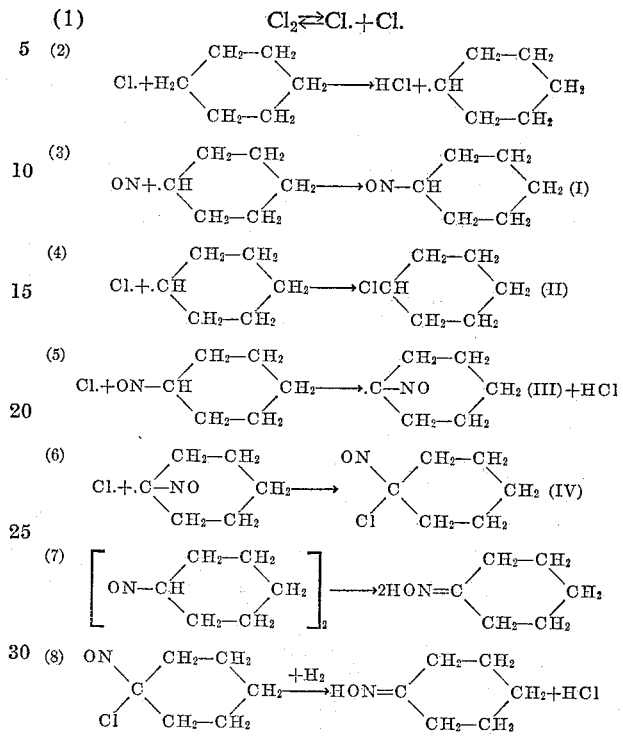

The reactions indicated are as follows: the chlorine molecule is split up into chlorine atoms under the excitation of light (1); the chlorine atoms react with the hydrocarbon with the formation of hydrogen chloride and alkyl radicals (2) which then either react with the nitric oxide with the formation of nitroso-hydrocarbon I (3) which dimerizes in known manner to its colorless bis-nitroso compound, or with a further chlorine atom to form a chloro-hydrocarbon II (4). The nitroso-hydrocarbon I or its dimer, respectively, can again react with chlorine atoms with the formation of hydrogen chloride and nitrosoalkyl radicals III (5) which form 1-chloro-1-nitroso-hydrocarbon IV with nitric oxide (6). Reactions 7 and 8 can be carried out after separating the unchanged initial material and without irradiation. The conversion of the dimeric nitroso compound to oxime takes place for example by heating it to about 50° C. to 150° C., according to Equation 7, and that of the 1-chlor-1-nitroso-compound for example by reducing it according to Equation 8.

In the light reactions, small amounts of more highly chlorinated compounds and nitro compounds are formed as by-products. For activation of the chlorine molecule according to Equation 1 there may be used the sources of light usual for this purpose, as for example sunlight or the light of a mercury lamp, which if necessary is passed through a filter. Light of the wavelength 350 to 700 millimicrons has proved to be favorable.

The light reactions are preferably continued only until part of the hydrocarbon, for example 2 to 10%, has undergone reaction, working up then being effected for example by washing the reaction mixture with dilute caustic alkali solution, drying and then distilling off the unreacted hydrocarbon which can then be reacted again. The chlornitroso-hydrocarbon and also the chloro-hydrocarbons formed as by-products are recovered, if desired by fractional distillation, preferably under reduced pressure, and the bis-nitroso-hydrocarbon as the main product is retained as residue.

If a hydrocarbon saturated with the corresponding bis-nitroso compound be used as a starting material for the light reactions, the bis-nitroso compound formed during the reaction crystallizes out in a very pure state and can be sucked off before working up the reaction solution.

The reaction solution can also be worked up by leading them, after having washed them with dilute caustic alkali solution, through an alumina or silica gel or active carbon packed adsorption column in which the bis-nitroso and chlornitroso compounds are adsorbed quantitatively. These can be eluated by means of polar solvents, such as methanol or acetone, and transformed into oximes by heating the eluate or reducing it. The transformation proceeds as well, if the alumina or silica gel containing the adsorbed bis-nitroso compound is allowed to stand for some time at ordinary temperature.

The conversion of the bis-nitroso-hydrocarbon having 10 to 24 carbon atoms into the oxime according to Equation 7 is effected by heating, preferably in an inert solvent such as methanol, acetone or carbon tetrachloride, at about 50° to 150° C., or by means of Lewis acids such as alumina or silica gel.

The reduction of the chlor-nitroso-hydrocarbon according to Equation 8 can be carried out by catalytic hydrogenation, the known hydrogenation catalysts, such as platinum oxide, palladium or nickel, being used. The hydrogenation is interrupted as soon as the amount of hydrogen corresponding to the chlorine content has been absorbed. The reduction can also be carried out by means of reducing agents, such as iron or zinc and hydrochloric acid, hydrazine, hydroxylamine, alkali and alkaline earth sulfides, thiosulfates and bisulfites, alkali metal aluminum and borohydrides. The chlor-nitroso-hydrocarbon is also transformed into oxime by heating it, for example to about 50° to 150° C., or by irradiating it with red light.

The following examples will further illustrate this invention but the invention is not restricted to these examples.

*Example 1*

A mixture of 1400 cc. per hour of nitric oxide and 175 cc. per hour of chlorine (measured at 15° C. and 735 mm. Hg) is led in a state of fine dispersion into 300 cc. of cyclohexane at 20° to 25° C. while irradiating with the light of a mercury immersion lamp. After 5 hours, the green solution is washed with dilute caustic soda solution, the resultant blue solution is dried with sodium sulfate, the unreacted cyclohexane is distilled off at 150 mm. pressure and the residue is subjected to fractional distillation at 10 mm. pressure. At 35° to 50° C. there passes over a mixture of about equal parts of 1-chlor-1-nitrosocyclohexane and chlorinated cyclohexane, and there remain behind 4 to 4.8 grams of almost pure bis-nitrosocyclohexane of the melting point 110° C., which can be obtained completely pure by recrystallization from cyclohexane or by sublimation and then melts at 116.5° to 117° C.

For conversion into the cyclohexanone oxime, the bis-nitrosocyclohexane is heated to boiling in ethanol until the blue-green color of the monomeric nitroso compound which at first occurs by reason of the dissociation of the bis-compound has disappeared. By evaporation there is obtained an almost quantitative yield of cyclohexanone oxime of the melting point 88° to 89° C. (after recrystallization from petroleum ether).

The 1-chlor-1-nitrosocyclohexane is dissolved in 3 times the amount of ethyl acetate and, after the addition of about 5% of platinum oxide, is hydrogenated at room temperature with hydrogen until the blue color has disappeared. The partly precipitated cyclohexanone oxime hydrochloride is neutralized with caustic soda solution. Further amounts of cyclohexanone oxime are thus obtained.

*Example 2*

A mixture of nitric oxide and chlorine in the volumetric ratio 10:1 is led into cyclo-octane in the light of a mercury lamp at 20° to 25° C. After 5 hours, the green reaction mixture is washed with dilute caustic alkali solution and the resultant blue solution is dried with sodium sulfate. The unreacted cyclo-octane is then distilled off at a pressure of 30 to 50 mm., and the residue of bis-nitrosocyclo-octane is heated for 10 minutes at 110° C. The resultant product is extracted several times with 2-normal hydrochloric acid and then several times with 2-normal caustic soda solution. The extracts are combined, brought to the pH value 6 to 7 and extracted with ether several times. After drying and distilling off the ether, the residue is subjected to distillation under reduced pressure. Very pure cyclo-octanone oxime is obtained which after recrystallization from petroleum ether melts at 40.5° to 41.5° C.

*Example 3*

The procedure of Example 2 is followed except that before heating the reaction product at 110° C., the 1-chloro-1 nitroso-cyclo-octane formed as a by-product is distilled off at greatly reduced pressure and is then catalytically hydrogenated as described in Example 1 or by means of hydrazine. A better total yield of cyclooctanone oxime is thus obtained.

*Example 4*

The procedure of Example 2 or 3 is followed but using the same amount of normal-heptane instead of the cyclo-octane. A mixture of heptanone oximes having the boiling point 96° to 98° C. at 17 mm. pressure is obtained.

*Example 5*

The procedure of Example 2 or 3 is followed with methylcyclohexane as the initial material. Bis-nitrosomethylcyclohexane is obtained as the intermediate product. Pure methylcyclohexanone oxime of the boiling point 104° C. at 15 mm. pressure is obtained as the final product.

*Example 6*

A mixture of 1400 cc. per hour of nitric oxide and 175 cc. per hour of chlorine is led at from 20° to 25° C., as a fine dispersion into a mixture of 100 cc. of cyclohexane and 200 cc. of carbon tetrachloride while irradiating with the light of a mercury immersion lamp. After 5 hours, the solution is washed with dilute caustic soda solution, the unreacted cyclohexane and the carbon tetrachloride are distilled off and the residue of bis-nitrosocyclohexane is further treated as described in Example 1, a very pure cyclohexanone oxime being obtained.

*Example 7*

Bis-nitrosocyclohexane obtained by any of the methods described in the foregoing examples is heated at about 120° C. until the blue color of the melt has disappeared. By distillation under reduced pressure there is obtained a practically quantitative yield of pure cyclohexanone oxime having a melting-point of 90° to 91° C.

The transformation may also be carried out by introducing the bis-nitroso compound into pure molten cyclohexanone oxime and heating to 110° to 120° C. until the blue color has disappeared.

*Example 8*

A solution of pure bis-nitroso-cyclohexane in excess cyclohexane is led through an alumina or silica gel packed adsorption column. The column is kept in the dark for about 50 hours until there is no more unchanged nitroso compound left. The oxime formed is then eluated with methanol. After removing the solvent from the eluate, there is obtained a practically quantitative yield of cyclohexanone oxime melting at 88° to 89° C.

*Example 9*

Into a solution of pure 1-chlor-1-nitrosocyclohexane in about five volume parts of methanol a methanolic solution of hydrazine hydrate is introduced, while stirring and cooling until the blue color has disappeared, one and half molecules of hydrazine being consumed. The mixture which has a neutral reaction is diluted with water and extracted with ether. After distilling off the ether, there are obtained about 90 percent of the theoretical amount of cyclohexanone oxime melting at 88° to 89.5° C.

*Example 10*

Into a solution of 14.7 grams of pure 1-chlor-1-nitrosocyclohexane in 75 cc. of methanol 2.5 grams of hydrazine hydrate (0.5 mol) are introduced and then, while stirring and cooling an aqueous solution of 4.0 grams of caustic soda (1 mol) is added until the blue color has disappeared. When working up the neutral reaction mixture in the usual manner, cyclohexanone oxime is obtained in a yield of 95 percent of the theoretical amount.

*Example 11*

Into a solution of 14.7 grams of 1-chlor-1-nitrosocyclohexane in 75 cc. of methanol there is introduced an aqueous-methanolic solution of 6.9 grams (1 mol) of hydroxylamine hydrochloride and then, while stirring and cooling, an aqueous solution of 8.0 grams of caustic soda (2 mols) is added until the blue color has disappeared. When working up the neutral reaction mixture cyclohexanone oxime is obtained in good yields.

*Example 12*

Into a methanolic solution of a crude mixture of 1-chlor-1-nitrosocyclohexane and chlorcyclohexane there is introduced, while cooling and stirring, a solution of sodium bisulfite, care being taken that the reaction mixture remains weakly alkaline by adding small amounts of an aqueous caustic soda solution. When the blue color has disappeared, the mixture is worked up. There are obtained about 65 percent of the theoretical amount of cyclohexanone oxime.

Instead of sodium bisulfite there can be used sodium thiosulfate.

*Example 13*

1-chlor-1-nitrosocyclohexane is introduced, while well stirring, into a mixture of iron powder and aqueous hydrochloric acid. As soon as the blue color has disappeared, the mixture is filtered. The solution is neutralized by means of alkali and extracted with ether. After removing the ether there are obtained about 90 percent of the theoretical amount of pure cyclohexanone oxime.

Instead of iron powder powdered zinc can be used with equal success.

*Example 14*

A methanolic solution of 1-chlor-1-nitrosocyclohexane is irradiated with sun light or with the light of an ordinary incandescent lamp or with red light having a wave length of about 650 millimicrons, until the blue color has disappeared. The brown solution is neutralized by means of barium or sodium carbonate and distilled with steam, pure cyclohexanone oxime being obtained in good yields.

Instead of irradiating, the methanolic solution of 1-chloro-1-nitrosocyclohexane can also be transformed into cyclohexanone oxime by boiling it under reflux until the blue color has disappeared.

*Example 15*

Cyclohexane is saturated with pure bis-nitrosocyclohexane obtained by the method described in any of the foregoing examples. This solution is treated with nitric oxide and chlorine according to Example 1. The bis-nitrosocyclohexane crystallizes out as formed during a 5 hours' reaction and is filtered off before working up the reaction mixture according to Example 1.

*Example 16*

The reaction mixture obtained by introducing nitric oxide and chlorine into cyclohexane while irradiating for 5 hours, is washed with dilute caustic alkali solution and then led through an alumina or silica gel or active carbon packed adsorption column in which the reaction products including the bis-nitrosocyclohexane and 1-chlor-1-nitrosocyclohexane are adsorbed. They are eluated with methanol. To the methanolic solution a methanolic solution of hydrazine hydrate is added, while stirring and cooling, until the blue color of the 1-chlor-1-nitrosocyclohexane has disappeared. The colorless neutral solution is then boiled under reflux until the blue color of the monomeric nitrosocyclohexane which develops by the heating and dissociation of the colorless dimeric compound has disappeared. By working up the solution, almost pure cyclohexanone oxime is obtained in practically quantitative yields, calculated on the amount of bis-nitroso and 1-chlor-1-nitroso compound present in the starting reaction mixture.

As will be recognized from the foregoing description and examples, the bis-nitrosoalkanes and bis-nitroso cycloalkanes are produced in good yields and are, therefore, highly useful intermediate products in the production of various oximes. The final products are, of course, of known utility, especially in the production of valuable polymers.

The invention is hereby claimed as follows:

1. A bis-nitrosohydrocarbon selected from the group consisting of bis-nitrosoalkanes and bis-nitrosocycloalkanes having from 10 to 24 carbon atoms.
2. Bis-nitrosocyclohexane.
3. Bis-nitrosocyclooctane.

No references cited.